July 14, 1964 N. J. MESSINA 3,140,534
KIT AND METHOD FOR FORMING PIPE LINE TEMPLATES
Filed Dec. 3, 1962 2 Sheets-Sheet 1
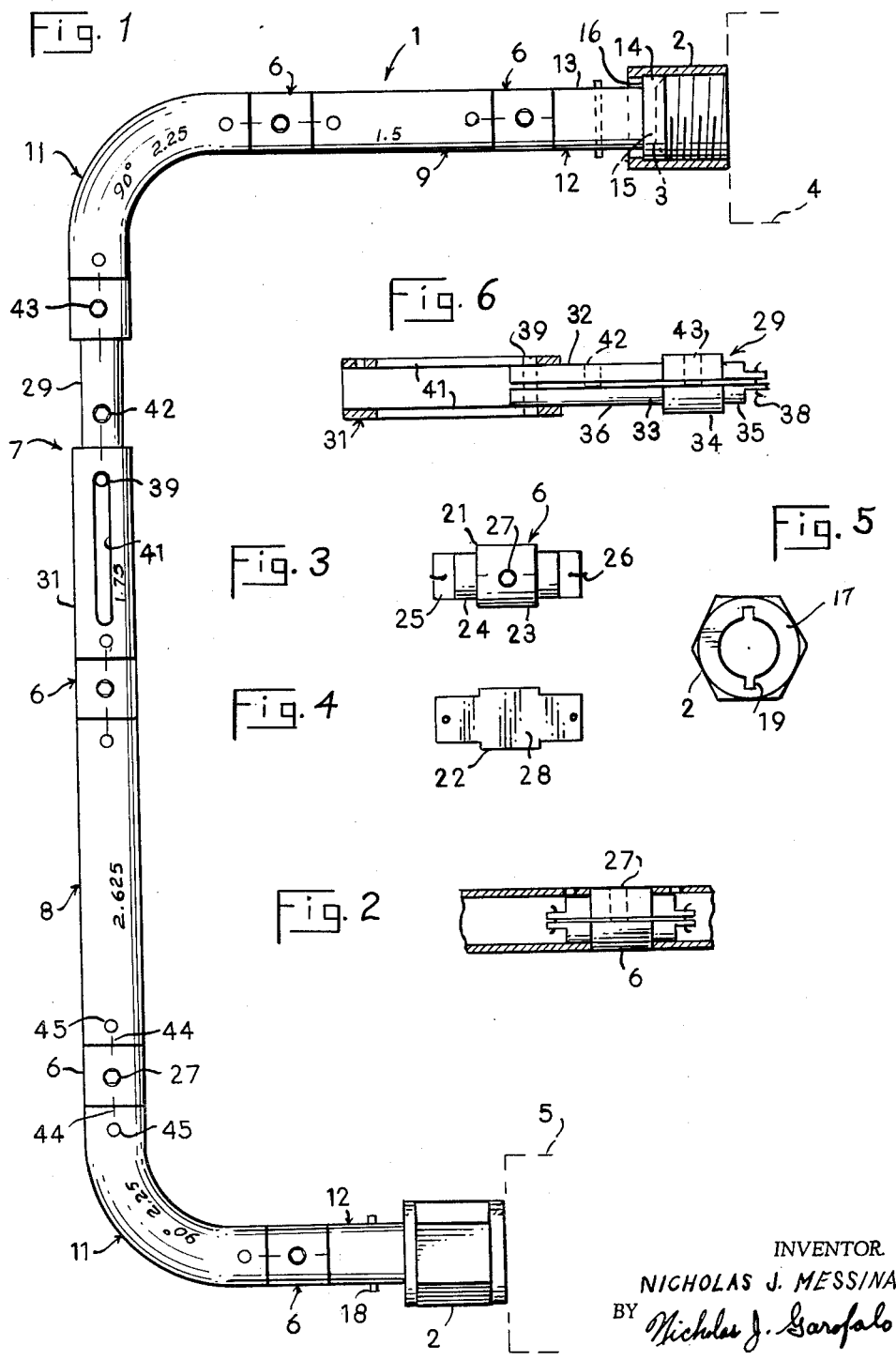

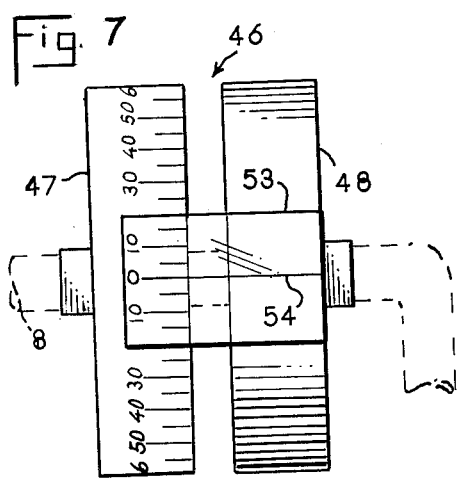
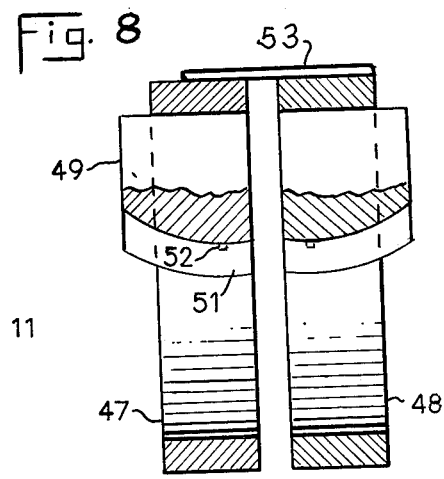
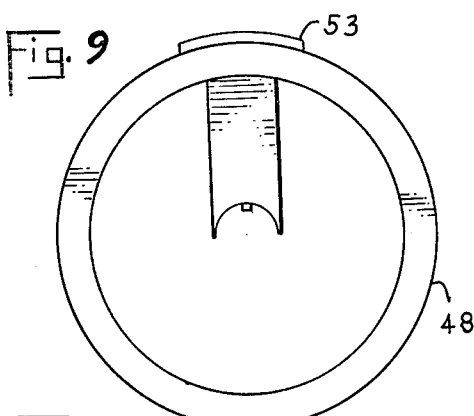
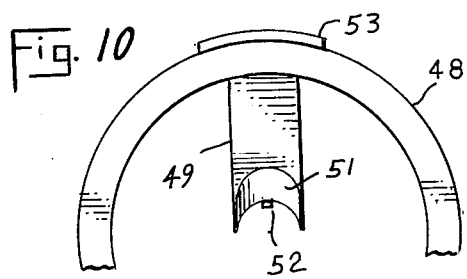
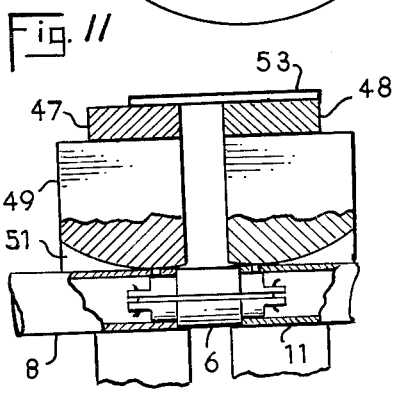

United States Patent Office 3,140,534
Patented July 14, 1964

3,140,534
KIT AND METHOD FOR FORMING PIPE LINE TEMPLATES
Nicholas J. Messina, 23 Balfour Drive, Bethpage, N.Y.
Filed Dec. 3, 1962, Ser. No. 241,809
8 Claims. (Cl. 29—407)

This invention is concerned with a novel and advantageous method for preforming an integral pipe line of accurate dimensions intended to be used to connect one device fixed at a specific location with another device fixed at another location.

The invention is further concerned with a kit comprising an assortment of pipe sections and associated connectors from which pipe line templates extending between any two selected fixed devices may be quickly assembled; and from which templates integral permanent pipe lines intended to accurately connect the selected devices to one another may be formed and, if required, mass produced.

A particular advantage of the invention lies in the time and labor which is saved in making a pipe line. A further advantage is that by means of the invention an accurately fitting pipe line may be quickly formed.

A further and very beneficial advantage of this invention is that pipe line templates may be quickly disassembled when no longer needed, and the components thereof may be returned to the kit for further use.

A feature of the invention is its assortment of parts with which pipe line templates of various lengths and contours may be quickly assembled.

Another feature of the kit is a connector element which enables pipe sections to be quickly coupled together or uncoupled.

A further feature of the kit is an extensible connector which not only enables two sections of piping to be coupled together, but also enables adjustable extensions to be made in a pipe line template as might be required to provide an accurate fit of the template between two specific devices.

A still further feature of the kit is a unit which enables a reading to be taken of the angle of rotation of one section of piping in the template relative to another.

While the invention is subject to wide commercial application, it is especially suited for use in the aircraft industry where planes are mass produced and the pipe lines required to be installed in the several planes are identical. Instead of each pipe line being formed in conventional manner at the time of installation, the pipe lines required for all of the planes may by means of the invention be mass produced at some time prior to the time appointed for installation. When the pipe lines are mass produced in this manner, it becomes a simple and time saving matter to subsequently connect each preformed pipe line in position when installation is required.

Accordingly, an object of the invention is to provide a novel and advantageous method for making template means from which a permanent pipe line required to be connected between any two selected devices may be accurately formed.

A further object of the invention is to provide a kit of parts from which a pipe line template may be quickly assembled, and which template may when no longer needed be quickly disassembled for return of the components thereof to the kit for further use.

A still further object of the invention is to provide a kit of parts for assembling a pipe line template wherein the parts are identified by markings thereon from which a chart of the specific components forming the assembled template may be prepared.

And another object of the invention is to provide in the kit of parts a unit for quickly and accurately determining the angle of rotation of one part in the pipe line template relative to another.

In accordance with the invention a kit of parts is provided containing a large assortment of pipe sections of various sizes and a quantity of associated connectors from which a pipe line template extending between two fixed devices may be rapidly assembled. As the template is assembled, the size and nature of each component thereof as well as the angle of rotation of one part relative to another is noted upon a chart. Upon completion of the template and the chart, the template may be disassembled and the parts thereof returned to the kit for further use. The chart is retained as a specification for forming the permanent pipe line that is intended to connect the two devices together.

The invention further lies in the particular construction of the parts of the kit and also in their mode of association with one another for effecting the results intended herein.

The foregoing and other objects and advantages of this invention will appear more fully hereinafter from a consideration of the detailed description which follows, taken together with the accompanying drawings, wherein an embodiment of the invention is illustrated. It is to be expressly understood, however, that the drawings are only for purposes of illustration and description, and they are not to be taken as defining the limits of the invention.

In the accompanying drawings:

FIG. 1 is a plan view of a pipe line template which has been assembled from a kit; and it is shown as being connected at its ends to two fixed devices, shown in broken line;

FIG. 2 is a sectional detail showing two pipe sections coupled together by means of a certain one of the connectors of the kit;

FIG. 3 is a top plan view of the connector shown in FIG. 2;

FIG. 4 is a plan view of the inner flat face of the lower half section of the connector shown in FIG. 2;

FIG. 5 is a rear end view of a collar nut;

FIG. 6 is a detail of an extensible connector;

FIG. 7 is a plan view of a unit for determining the angle of rotation of one pipe section relative to another;

FIG. 8 is a cross section taken through the center of FIG. 7;

FIG. 9 is a left end view of the ring shown at the right in FIG. 7;

FIG. 10 is a fragmentary right end view of the ring shown in FIG. 9; and

FIG. 11 is a sectional detail showing the manner of using the unit shown in FIG. 7.

In FIGS. 1–6 is illustrated a pipe line template generally designated 1, which was assembled from a plurality of separable parts contained in a kit. The template 1 has a terminal connector, such as the collar nut 2 at each end. One of the nuts 2 is adapted to threadedly engage a male fitting 3 of a fluid device 4; and the other nut 2 is adapted to threadedly engage a similar male fitting 3, not shown, of a second fluid device 5. The fluid devices 4 and 5 may be any two spaced devices having fixed locations in some machine or apparatus. Between the terminal connectors 2 the pipe line template 1 includes an assortment of pipe sections of uniform diameter assembled in end to end relation by means of intermediate connectors 6 and 7.

The elements 8 and 9 are sections of straight pipe, one being merely longer than the other.

The elements 11 are elbows or angle forms of pipe, here illustrated as having angles of 90 degrees.

The elements 12 are terminal members adapted for association with the terminal connectors 2. A terminal member 12 comprises a short section of pipe 13 upon one end of which has been press fitted a female element 14 having a beveled seat 15 with which a male fitting 3 of a fluid device is adapted to seat.

The terminal connector 2 is a collar nut, open in its ends. It is internally threaded at its forward end for engagement with a threaded male fitting 3. The pipe section 13 of the terminal member 12 is adapted to be freely inserted through the threaded end of a nut 2 until a peripheral shoulder 16 of the female element 14 seats against an internal collar 17 at the rear of the nut. As the pipe 13 is passed through the nut, radially projecting ends of a pin 18 fixed in pipe 13 are caused to pass through slots 19 of the collar to the rear of the latter. The nut is then capable of rotation relative to the pipe 13 to enable the nut to be threadedly engaged upon a fitting 3. When the slots 19 are out of register with the ends of the pin 18, the terminal member 12 is prevented from slipping free of the nut 2.

The intermediate connector 6 is a unit defined by two half sections 21 and 22 of identical form held loosely together. The connector 6 has a central cylindrical portion 23 the diameter of which is substantially equal to that of the outer diameter of any of the pipe sections. Adjoining opposite ends of this central portion and coaxial therewith are reduced portions 24. Each portion 24 has a diameter slightly less than the inner diameter of a pipe section, whereby it may be slidably entered into an open end of the pipe section, as appears in FIG. 2. Extending axially from each reduced portion 24 is a stepped in flat end portion 25. A separate wire clip 26 bent over at its ends extends slidably through each end portion 25. The clips 26 hold the two half sections 21 and 22 of the connector 6 loosely together, permitting slight radial movement of one relative to the other but restraining them against relative axial movement.

A set screw 27 threaded in a bore centrally of one of the half sections, here the half 21, is adapted when threaded inwardly through the bore to press against a flat inner face 28 of the other half section so as to spread the two halves 21 and 22 radially apart to the extent permitted by the clips 26.

Any two sections of pipe may be releasable coupled together by means of a connector 6 in the manner as indicated in FIG. 2. To this end, the reduced portions 24 are first slidably entered into corresponding ends of two sections of pipe. The set screw 27 is then tightened so as to spread the sections of the connector into tight engagement with the inner walls of the associated pipe sections, causing the latter to be held fast to the connector. Obviously, loosening the connector 6 by retracting or unthreading the set screw 27, permits the connector to be slipped free of the pipe sections.

The intermediate connector 7 is an extensible adjustable connector. It includes a connector member 29 having a pin and slot slide connection with a short section of pipe 31, as indicated in FIG. 6. The connector member 29 is defined by a pair of half sections 32 and 33 of identical form held loosely together. It includes a cylindrical portion 34 the diameter of which is substantially equal to that of the outer diameter of any of the pipe sections. Coaxial with the opposite ends of this cylindrical portion are reduced portions 35 and 36, each having a diameter slightly less than that of the inner diameter of any of the pipe sections. Extending axially from the short portion 35 is a stepped in flat end portion 37 through which slidably extends a wire clip 38. The ends of the clip are bent over; and the clip allows slight radial movement of the half sections 32 and 33 relative to each other, but restrains them against endwise movement relative to each other. The other reduced portion 36 is elongated, and is slidably received in an open end of the pipe section 31. A pin 39 extending diametrically through the portion 36 near the free end of the latter projects slidably at its ends into a pair of opposed longitudinal slots 41 of pipe section 31. By means of the latter arrangement the connector member 29 and the pipe section 31 are slidable axially relative to one another, the ends of the slots 41 cooperating with the ends of the pin 39 to limit the extent of such movement in each direction. The pin is tight in one of the half sections, here section 32; and is radially slidable relative to the other section 33. A pair of set screws 42 and 43, one of which is threadable in a radial bore centrally of the elongated portion 36, and the other of which is threadable in a radial bore centrally of the cylindrical portion 34, are employed to spread the two half sections 32 and 33 radially apart to the extent permitted by the clip 38 and the internal wall of the pipe section 31.

The connector element 29 of the extensible member 7 is adapted to be coupled at its short end 35 to a section of pipe in the manner of the connector 6. The short section of pipe 31 is adapted to be slidably adjusted relative to the elongated portion 36 of the connector and, when the set screw 43 is tightened the pipe section 31 becomes releasably locked in its adjusted position.

The several foregoing pipe sections and connectors are parts of a kit. FIG. 1 shows a pipe line template 1 which has been assembled from these parts. In assembling the template 1 a terminal connector 2 was first fitted with a terminal pipe element 12 and was then threaded upon a male fitting 3 of a selected one of the fluid devices, here the device 4. The various sections of pipe indicated in the template were then coupled end to end by means of the connectors 6 and 7. Finally, the terminal members 12 and 2 were added to complete the template for connection with the male fitting 3 of the device 5. The adjustable connector 7 was extended as required to enable the finally added terminal connector 2 to be threadedly tightened upon the fitting 3 of the device 5 so as to obtain an accurately fitting pipe line template connecting the two fluid devices 4 and 5 together.

It is to be understood that the several parts illustrated in FIGS. 1 to 6 are multiplied in number in the kit. It is also to be understood that the straight lengths of pipe, as well as the angle forms of pipe are not limited in the kit to the specific lengths and angles shown; but that sections of straight pipe of various lengths, and angle forms of various angles are included, whereby pipe line templates of various lengths and contours may be assembled.

The purpose of the pipe line template is to enable a permanent integral pipe line to be formed therefrom. To this end, each part of the template is identified upon a chart, not shown, in the order in which it was added. To facilitate this, each part in the kit has inscribed thereon its nature, including its length and the degree of its angle. There is further indicated on the chart, when required, the angle of rotation of one section of pipe relative to the section of pipe to which it is coupled.

So as to enable the angle of rotation to be determined, there is inscribed a guide line 44 lengthwise of each part in the kit, with the exception of the terminal members 2 and 13 whereon a guide line is not needed. Centered on the guide line close to each end of a pipe section is a pin hole 45. When the template is being assembled, the various parts thereof are normally coupled so that the guide lines of one part coincides with that of the next. When, because of the direction which the template line must take, a newly added section of pipe has an angle of rotation relative to the previously added section of pipe, the guide line of the newly added section will be angularly removed relative to that of the other.

Means or a unit 46 is provided in the kit for reading this angle of rotation as to the degree thereof from normal, and whether it is a clockwise or counterclockwise direction. This unit comprises a pair of ring members 47 and 48 of the same diameter, each having a broad peripheral surface. Ring member 47 has a micro scale inscribed about its surface, reading from 0–180 degrees in each direction. The scale markings clockwise (FIG. 7) of the "0" marking are black lined, while the markings counterclockwise are red lined. Anchored fast to the inner wall of the ring is a radially extending block 49 having an axially directed groove 51 provided with a radius of curvature complementing that of the pipe sections of the kit, whereby the ring member is enabled to seat upon a section of pipe. When so seated, a radially depending pin 52 in the groove is adapted to engage in a pin hole 45 of the pipe. The other ring member 48 is identical in structure to the ring member 47, except that in lieu of scale markings it is provided with a transparent pointer arm 53 having a pointer line 54 thereon extending parallel to the horizontal axis of the ring member.

To obtain a reading of the angle of rotation of one section of pipe relative to another, the ring member 48 is slipped over the free end of the template and is seated by means of its pin 52 in a pin hole 45 on the inner one of the two sections of pipe relative to which the reading is to be taken, as appears in FIG. 11. In this seated position of the ring member 48 the pointer arm will point toward the free end of the template. Next, the ring member 47 is slipped over the free end of the template and is seated on the newly added section of pipe by means of its pin 52 in a pin hole 45. In this seated position of the ring member 47 the scale markings of the latter will underlie and will be visible through the transparent pointer arm 53. That marking of the scale with which the pointer line 54 registers will indicate the angle of rotation of the newly added section of pipe relative to the previously added section of pipe in the pipe line template; and the clockwise or the counter-clockwise direction of rotation will be indicated by the color of the portion of the scale underlying the pointer line.

After the nature of each of the components of the fully assembled pipe line template, including the angle of rotation of the various components relative to one another have been indicated upon the chart, the template may then be disassembled and its component parts returned to the kit for further use. The chart is, however, retained. The markings on the chart may then be utilized by a worker to form an integral permanent pipe line having the exact configuration and length as may be required to fit between and permanently connect the two fluid devices 4 and 5 operatively together.

While an embodiment of the invention has been illustrated and described in detail, it is to be expressly understood that the invention is not limited thereto. It is my intent to claim the invention not only as shown and described but also in all such forms and variations thereof as may fall within the spirit of the invention and the scope of the appended claims.

I claim:
1. A kit from which a pipe line template may be assembled to provide the basis for a specification chart in accordance with which chart a permanent pipe line may be formed to connect one fixed fluid device with another, the kit comprising: straight pipe sections of various lengths, angle form pipe sections of various degrees, means for releasably coupling the pipe sections in end to end relation, terminal coupling elements for releasably coupling the ends of an assembly of coupled pipe sections with corresponding ends of the fluid devices, wherein each pipe section, coupling means and terminal coupling elements is identified by a specification marking thereon to be entered on the chart, and means for determining the angle of rotation of one pipe section relative to the next pipe section coupled thereto in an assembly, the angle of rotation when determined to be entered on the chart.

2. A kit as defined in claim 1, wherein the several pipe sections of the kit including the coupling means have a guide line inscribed thereon lengthwise, whereby the guide line of one section of pipe is alignable with the guide line of another section of pipe when the angle of rotation of one relative to the other is 0 degrees.

3. A kit as defined in claim 1, wherein the coupling means is a unit defined by two half sections having slight radial movement relative to each other and restrained against endwise movement relative to one another, the unit having an enlarged cylindrical intermediate portion and a reduced axial portion adjacent to each end of the intermediate portion, each reduced portion being slidably receivable in an open end of a pipe section.

4. A kit as defined in claim 3, wherein set screw means threadable through one of the half sections is cooperable with the other half section for spreading the half sections apart radially from one another.

5. A kit as defined in claim 4, wherein each reduced portion has an axially extending stepped-in portion, and clip means is loosely provided in each stepped-in portion serving to limit the extent of radial movement of one half section relative to the other.

6. A kit as defined in claim 3, wherein one of the reduced portions is relatively elongated and slidably received in a pipe section, and the elongated portion includes pin means cooperable with slot means longitudinally of the latter pipe section enabling this pipe section to be longitudinally adjusted relative to the elongated portion.

7. A kit as defined in claim 6, wherein a plurality of set screw means is provided threadable through one of the half sections and cooperable with the other half section for radially spreading one half section relative to the other.

8. A method for forming an integral pipe line to be permanently connected between a fluid device fixed at one point with another fluid device fixed at another point, comprising: assembling between the two devices a pipe line template formed of a succession of separable pipe sections releasably coupled one to the other beginning with a first terminal element coupled to one of the devices and ending with a second terminal element releasably coupled to the other device; noting upon a chart the order of assembly of the separable sections to one another, the nature of each component of the assembly, and the angle of rotation of any component relative to another; and utilizing the notations entered on the chart for forming an integral pipe line conforming in extent and configuration to that of the template.

References Cited in the file of this patent

UNITED STATES PATENTS

| | | |
|---|---|---|
| 2,431,100 | Woods | Nov. 18, 1947 |
| 2,874,456 | Weidel | Feb. 24, 1959 |
| 2,886,172 | Hodges | May 12, 1959 |